United States Patent Office 3,333,965
Patented Aug. 1, 1967

3,333,965
DRY MIX FOR CHEESE SOUFFLE
Wallace J. Kurtzhalts, Glenview, Ill., assignor to National Dairy Products Corporation, New York, N.Y., a corporation of Delaware
No Drawing. Filed Oct. 11, 1963, Ser. No. 315,675
5 Claims. (Cl. 99—94)

This invention relates generally to the preparation of a cheese product, and more particularly it relates to a reconstitutable cheese souffle. This application is a continuation-in-part application of Ser. No. 79,956, since abandoned, filed Jan. 3, 1961.

Various types of cheese-containing food dishes have been prepared for consumption. Many of these dishes can only be prepared by following a complicated procedure, including the sequential addition of a large number of ingredients. In this connection, various formulas have been set forth for the preparation of cheese souffles, which formulae call for the time-consuming, separate, step-wise addition and treatment of the several constituents.

The usual procedure for preparing a cheese souffle comprises the steps of preparing a white sauce from a number of ingredients and then adding a sharp cheese to the sauce. The cheese-sauce mixture is then heated so as to melt the cheese and the mixture is blended. After the melted cheese is sufficiently blended with the sauce, egg yolks are added. The mixture is reheated and stirred until it thickens. The thickened sauce, containing the cheese, is then folded into a meringue of stiffly whipped egg whites. The resulting mixture is then baked to a finished cheese souffle ready for consumption.

The time-consuming and complicated measuring and mixing steps required for the preparation of conventional cheese souffles often result in cheese souffles of varying characteristics. Where cheese souffles are being prepared on a day-to-day basis for commercial consumption, for example in restaurants, cafeterias and other commercial eating establishments, uniform characteristics of the cheese souffle is particularly important. Such uniform characteristics for cheese souffles has been found to be difficult to obtain utilizing available cheese souffle procedures, particularly where the cheese souffles are desirably prepared in a relatively short period of time.

It has now been discovered that a cheese souffle of a reproducible high quality and uniform characteristics can be prepared in a relatively short period of time with a minimum of processing steps through the utilization of a simplified cheese souffle mix that does not require the use of egg yolks or egg yolk solids. A cheese souffle mix which eliminates the time-consuming, separate mixing and measuring of individual ingredients of the cheese souffle is a desideratum and such a mix which does not require egg yolks offers unique advantages.

Accordingly, it is an object of this invention to provide an improved cheese souffle and an improved cheese souffle mix. A further object is to provide a method of forming a cheese souffle from a cheese souffle mix. Other objects and advantages of this invention will be apparent from a study of the following detailed description.

The improved cheese souffle mix of the present invention comprises the combination of a dry reconstitutable sauce mix and a dry reconstitutable albumen mix wherein the albumen mix comprises between about 6 percent and about 16 percent by weight, on a dry basis of the sauce mix.

The sauce mix may comprise a substantially dry mixture of an edible fat, grated cheese, milk solids, flour and certain flavoring ingredients, with or without egg yolk solids.

The edible fat may be any suitable shortening, including oleomargarine or plastic shortening, but preferably is a dried shortening such as that sold under the trade name "Beatreme C." "Beatreme C" is a mixture of 75 percent hydrogenated emulsified cottonseed oil containing 1.2 percent to 1.4 percent monoglyceride and 1.2 percent to 1.4 percent diglycerides, and 27 percent milk solids not fat. The edible fat preferably is present in the sauce mix in an amount of between about 15 percent and 26 percent by weight of the sauce mix.

Any type of dry grated American type cheese may be utilized in the sauce mix, but it is preferably a sharp, American type cheese. The cheese is preferably present in the sauce mix in an amount of between about 25 percent and about 60 percent by weight of the sauce mix. The flour may be present in an amount between about 8 percent and about 28 percent by weight of the sauce mix. While various flours used in baking may be employed, it is generally preferable to employ wheat flour.

The dry milk solids are present in an amount between about 10 percent and about 25 percent by weight of the sauce mix. In this connection, dry whey solids, whole milk solids, skim milk solids or the like, or mixtures thereof, may be utilized as the dry milk solids.

A specific example of such a dry sauce mix is a sauce mix comprising about 20 percent by weight of edible fat, about 47 percent by weight of dry grated cheese, about 10 percent by weight of flour and about 20 percent by weight of dry milk solids.

Egg yolk or egg yolk solids, long considered to be required in souffles, are not an essential ingredient of the sauce mix of the present invention. An acceptable cheese souffle may be prepared with or without the inclusion of egg yolk solids in the sauce mix. However, egg yolk solids may be included in the sauce mix if desired. When employed, the egg yolk solids are separately dried so as to be in the dehydrated form and comprise between about 8 percent and about 12 percent by weight of the dry sauce mix, preferably about 10 percent.

When a dry sauce mix is prepared which includes dry egg yolk solids, the constituents that form the dry sauce mix preferably comprises between about 15 percent to about 25 percent by weight of edible fat, between about 25 percent and about 40 percent by weight of dry gated cheese, between about 15 percent and about 20 percent by weight of flour, between about 10 percent and about 15 percent by weight of dry milk solids and between about 8 percent and about 12 percent by weight of dry egg yolk solids. A specific example of a dry sauce mix containing egg yolk solids comprises about 22 percent by weight edible fat, about 35 percent by weight dry grated cheese, about 18 percent by weight flour, about 12 percent by weight dry milk solids and about 10 percent by weight dry egg yolk solids.

The usual flavoring ingredients may also be included in the sauce mix, e.g., salt, mustard and pepper. These ingredients will usually comprise approximately 1 to 4 percent by weight of the sauce mix.

The dry sauce mix of the invention may be prepared by blending the individual dry ingredients together in any desired sequence and in the indicated proportions. The blended dry sauce mix is sized so as to pass through a screen smaller than about ⅜₂ inch, and preferably the dry sauce mix should be sized so as to pass through a 16 mesh screen. It has been found that the color of the dry sauce mix is more uniform when it is so sized.

The dry albumen mix comprises dry egg white solids. If desired, a leavening agent, such as cream of tarter may be included in the albumen mix in an amount from about 2 percent to about 8 percent by weight of the albumen mix. An amount of albumen mix which comprises from about 6 percent to about 16 percent by weight of the sauce mix is employed in combination with the sauce mix to form the cheese souffle mix of the present invention. The improved cheese souffle mix accordingly comprises the dry sauce mix and the dry albumen mix, to each of which water may be added to provide a reconstituted cheese souffle.

The initial step of the method of preparing an improved cheese souffle in accordance with the present invention comprises the preparation of the dry sauce mix and the dry albumen mix. After the two mixes are prepared, the dry sauce mix may be reconstituted with a suitable amount of water, as for example, approximately 125 to 170 parts of water, but preferably about 140 to 150 parts of water, per 100 parts of the sauce mix. The sauce mix mixture is then stirred and blended to a smooth consistency, and cooked while under agitation, at a medium cooking heat, e.g., 250° F. to 300° F., until thick (approximately 5 minutes).

As a further step in the preparation of the cheese souffle, the dry albumen mix is reconstituted with a suitable amount of water, preferably about 550 to 650 parts of water per 100 parts of albumen mix and blended to a smooth consistency and beaten with a rotary stirrer or similar means until a stiff meringue is formed.

In accordance with the method of the present invention, the reconstituted and cooked sauce mix is then folded into the beaten reconstituted albumen mix, and the mixture is baked at an oven temperature of about 300° F., usually for about 50–60 minutes.

The dry sauce mix and the dry albumen mix, can be separately prepared and packaged for distribution together as a cheese souffle mix, simplifying the home or commercial preparation of cheese souffle. The consumer may merely reconstitute each by adding water thereto, cook the sauce mix, beat the albumen mix and fold the cooked sauce mix and the beaten albumen mix together. Upon suitable baking, the cheese souffle is ready for consumption. This is a substantial improvement over step by step mixing and treating of the individual ingredients as in the conventional methods of preparing a cheese souffle. In the method of the present invention, the cheese need not be separately introduced into the white sauce and melted, nor is the use of egg yolks or egg yolk solids necessary in the sauce mix in order to provide an acceptable cheese souffle.

A high quality packaged cheese souffle mix may thus be provided which eliminates the necessity for the usual complicated processing steps and the inclusion of egg yolks in the souffle, which steps increase the cost of the finished cheese souffle product.

The following examples further illustrates certain aspects of the present invention:

EXAMPLE I

A dry sauce mix that does not contain any egg yolk solids was prepared by adding the following individual dry ingredients together in a common mixing bowl and blending them to a uniform mixture:

*Sauce mix*

| Ingredients: | Weight, grams |
|---|---|
| Flour | 60 |
| Dry non-fat milk solids | 80 |
| Dry whey solids | 40 |
| Sharp American grated cheese | 280 |
| Dried fat | 120 |
| Spices and salt | 8.4 |
| Total weight | 588.4 |

A dry albumen mix was also prepared in the same manner from the following ingredients:

*Albumen mix*

| Ingredients: | Weight, grams |
|---|---|
| Egg white solids | 79.5 |
| Cream of tartar | 2.5 |
| Total weight | 82 |

The dry sauce mix was reconstituted with one quart of water and the reconstituted sauce was cooked at 250° F. for 5 minutes while being stirred; during which time the sauce appreciably thickened. The albumen mix was reconstituted with 2 cups of water and beaten for 3 minutes until stiff. The thickened sauce mix was then folded into the beaten albumen mix, or merinque. The resulting product was baked for about 55 minutes at about 300° F. in a quart and a half size casserole in a closed oven. The finished cheese souffle obtained was tasted and determined to be of high quality and had an acceptable flavor and appearance.

EXAMPLE II

A dry sauce mix containing egg yolk solids was prepared by adding the following individual dry ingredients together in a common mixing bowl and blending them to a uniform mixture:

*Sauce mix*

| Ingredients: | Weight, grams |
|---|---|
| Flour | 36 |
| Dry non-fat milk solids | 25 |
| Egg yolk solids | 22 |
| Sharp American grated cheese | 70 |
| Butter | 46 |
| Spices and salt | 4 |
| Total weight | 203 |

A dry albumen mix was also prepared in the same manner from the following ingredients:

*Albumen mix*

| Ingredients: | Weight, grams |
|---|---|
| Egg white solids | 16.5 |
| Cream of tartar | 1.0 |
| Total weight | 17.5 |

The dry sauce mix was reconstituted with one and one quarter cups of water, stirred and cooked in accordance with Example I. Similarly, the albumen mix was reconstituted with one half cup of water and beaten to form a meringue and the thickened sauce mix was folded into the meringue. The product was then baked at 350° F. for 55 minutes. The finished cheese souffle obtained was light and fluffy and had an excellent flavor and appearance.

The simplified procedure as illustrated in the foregoing examples represents a substantial improvement over the complicated conventional processing step usually employed in the preparation of cheese souffle and provides a light and fluffy souffle without the necessity of including egg yolks or egg yolk solids therein.

Various modifications in the method of the present invention and in the composition of the cheese souffle mix as are within the skill of those versed in the art are contemplated as being within the scope of the present invention.

What is claimed is:

1. A dry souffle mix including a major amount of a dry reconstitutable sauce mix and a separate minor amount of a dry reconstitutable albumen mix, said sauce mix comprising edible fat, dry grated cheese, flour, milk solids, dried egg yolks and flavoring ingredients, said albumen mix comprising egg white solids and a leavening agent, said sauce and said albumen mix when reconstituted, folded together and cooked forming a finished cheese souffle.

2. A dry cheese souffle mix including a reconstitutable dry sauce mix and from about 6 percent to about 16 percent by weight of said sauce mix of a dry reconstitutable albumen mix, said dry sauce mix comprising between about 15 percent and about 26 percent by weight of said sauce mix of an edible fat, between about 25 percent and about 60 percent by weight of said sauce mix of a dry grated cheese, between about 8 percent and about 28 percent by weight of said sauce mix of flour, between about 8 percent and about 12 percent by weight of said sauce mix of dry egg yolk solids, and between about 10 percent and about 25 percent by weight of said sauce mix of dry milk solids, said albumen mix comprising dry egg white solids and between about 2 percent and about 8 percent by weight of said albumen mix of leavening agent.

3. A dry cheese souffle mix including a dry reconstitutable sauce mix and from about 6 percent to about 16 percent by weight of said sauce mix of a dry reconstitutable albumen mix, said dry sauce mix comprising between about 15 percent and 25 percent by weight of said sauce mix of an edible fat, between about 25 percent and 40 percent by weight of said sauce mix of a dry grated cheese, between about 8 percent and about 12 percent by weight of said sauce mix of dry egg yolk solids, and between about 15 percent and about 20 percent by weight of said sauce mix of flour and between about 10 percent and about 15 percent by weight of said sauce mix of dry milk solids; said albumen mix comprising dry egg white solids and between about 2 percent and about 8 percent by weight of said albumen mix of cream of tartar.

4. A dry cheese souffle mix including a dry reconstitutable sauce mix and from about 6 percent to about 16 percent by weight of said sauce mix of a dry reconstitutable albumen mix; said sauce mix comprising about 22 percent by weight edible fat, about 35 percent by weight dry grated cheese, about 18 percent by weight flour, about 12 percent by weight dry milk solids and about 10 percent by weight dry egg yolk solids; said albumen mix comprising egg white solids and from about 2 percent to 8 percent by weight of said albumen mix of cream of tartar.

5. A method of preparing a cheese souffle which comprises the steps of: reconstituting a dry sauce mix with water, said sauce mix comprising an edible fat, dry grated cheese, flour, milk solids, dry egg yolk solids and flavoring ingredients and heating the reconstituted sauce mix until thick; reconstituting a dry albumen mix comprising a major amount of egg albumen and a minor amount of a leavening agent with water and beating the reconstituted albumen mix until a stiff meringue is formed and baking the folded sauce and meringue, whereby a cheese souffle is provided.

References Cited
UNITED STATES PATENTS
2,939,792 6/1960 Kline et al. _____ 99—94
3,043,700 7/1962 Szizesniak _____ 99—92

OTHER REFERENCES
Lord: Everybody's Cookbook, revised edition, Harcourt, Brace and Co., New York, p. 211.

A. LOUIS MONACELL, *Primary Examiner.*

D. M. STEPHENS, D. M. NAFF, *Assistant Examiners.*